Sept. 1, 1925.                                                     1,552,009
E. J. REBECHINI
ROLL FOR NUT BLANCHING MACHINES
Filed Sept. 15, 1924
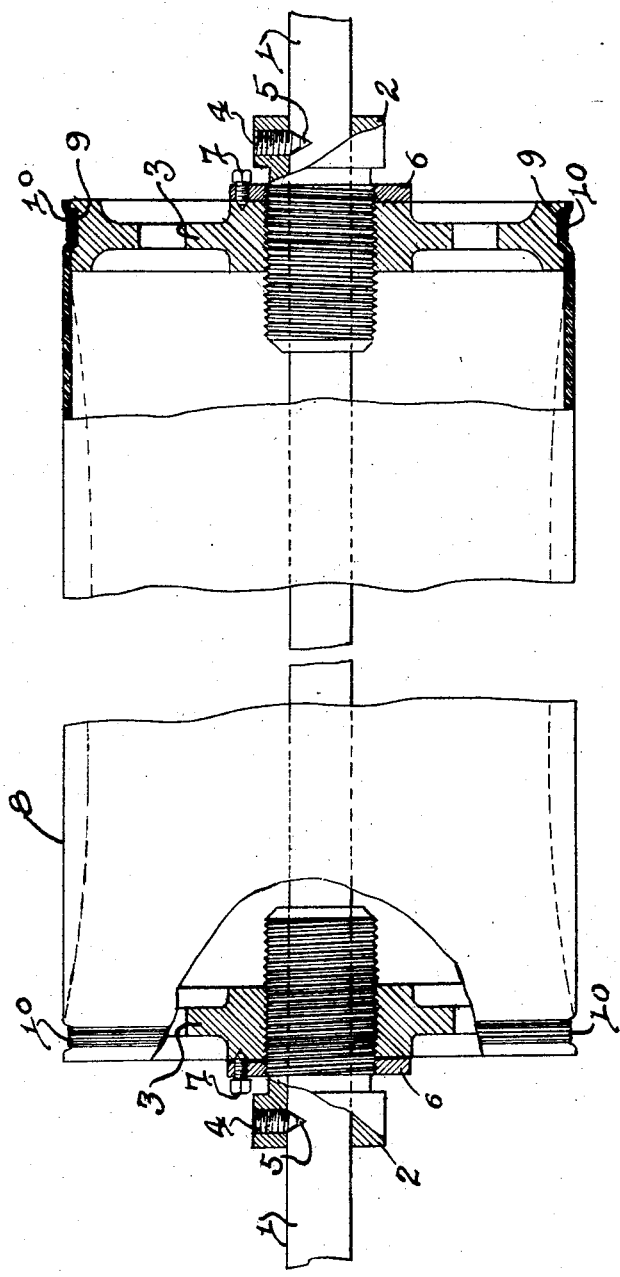
Inventor
Eugene J. Rebechini
by
Attys Patented Sept. 1, 1925.

1,552,000

UNITED STATES PATENT OFFICE.

EUGENE J. REBECHINI, OF CHICAGO, ILLINOIS.

ROLL FOR NUT-BLANCHING MACHINES.

Application filed September 15, 1924. Serial No. 737,683.

*To all whom it may concern:*

Be it known that I, EUGENE J. REBECHINI, a subject of the King of Italy, and a resident of the city of Chicago, in the county of Cook and State of Illinois, have invented certain new and useful Improvements in a Roll for Nut-Blanching Machines; and I hereby declare that the following is a full, clear, and exact description of the same, reference being had to the accompanying drawings, and to the numerals of reference marked thereon, which form a part of this specification.

This invention relates to improvements in rolls of the type used in nut blanching machines and is more particularly adapted to that type of machines illustrated in my prior application, Serial No. 696,413, for a nut blanching machine.

It is very advantageous in machines for blanching nuts to have rolls which will resiliently engage the nut surface with a minimum of compression, the latter tending to split the nuts which of course is undesirable. The spongy rubber rolls in use heretofore have afforded a resilient engagement of the nut kernels but have produced a comparatively large amount of compression of the kernels which tended to split them.

It is therefore the object of this invention to provide a roll of this type with a periphery adapted to resiliently engage the nut surfaces without too great pressure thereon.

It is also an object of this invention to provide a roll having a flexible periphery with adjustable resiliency.

Other and further important objects of this invention will be apparent from the disclosures in the specification and the accompanying drawings.

This invention (in a preferred form) is illustrated in the drawings and hereinafter more fully described.

On the drawings:

The drawing is a horizontal view, partly in section, of a roll embodying the principles of this invention.

As shown on the drawings:

The roll is mounted on a shaft 1 which is driven by a suitable gearing (not shown). Fitting slidably over the shaft 1 and oppositely disposed are sleeves 2 which are threaded to engage perforated disks 3 mounted thereon. Fitted in the sleeves 2 are set-screws 4 which may be screwed down to engage holes 5 in the shaft 1 thus preventing either rotational or longitudinal movement of the sleeves 2 relative to the shaft 1. Locknuts 6 fitted with set-screws 7 also engage the sleeves 2 outward of the disks 3 and are adapted to lock the latter against rotation of said sleeves. Disposed between the disks 3 and mounted on the periphery thereof is a resilient member 8. The member 8 is preferably of a resilient fabric material or sheet rubber. It is secured to the peripheries of the disks 3 in the grooves 9 thereof by wire 10.

The operation is as follows:

In the operation of the rolls wherein a pair of rolls of this class rotate in juxtaposed position the peripheries thereof due to centrifugal force are thrown outward the flexible member 8 on each roll assuming the straight line position in the drawing as distinguished from the dotted line position which in exaggeration represents the at-rest position. In the straight line position the member 8 of each roll resiliently engages the nut kernels to cause them to roll between said members and the skins to be rubbed off. By rotating the sleeves 2 on the shaft 1 relative to the disks 3 the tension and the resulting resiliency of the member 8 may be varied.

It will be apparent that this roll is very much superior to the rolls used heretofore with soft substance secured to the periphery having an inflexible periphery throughout the whole length, in that the compression obtained on the kernels is merely due to centrifugal force and is not likely to be great enough to cause splitting. It will also be seen that since the resiliency of the roll may be varied the machine may readily accommodate various sizes of nuts.

The perforation of the disks 3 make possible the alignment of the roll due to centrifugal force as heretofore described.

Another advantage of this roll is that it is cheaper and more easily repaired than the expensive rolls heretofore used, deteriorates less rapidly and may be operated at a higher rate of speed.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A roll of the class described comprising a pair of disks and a flexible member mounted between said disks on the periphery thereof, and means for varying the tension of said flexible member, said means comprising a sleeve adjustably engaged through each of said disks.

2. In a roll for blanching nuts, a cylindrical flexible member, means on each end of said member for supporting said member, means associated with said supporting means for extending or contracting said flexible member, said associated means comprising a sleeve extending through each of said supporting means, and means for holding each of said sleeves in axially spaced position independent of the relative movement of said disks thereon.

3. In a roll for blanching nuts, a pair of sleeves, a disk on each of said sleeves and a cylindrical flexible member supported by said disks, said sleeves being relatively movable with respect to said disks.

4. In a roll for blanching nuts, a pair of sleeves, a disk on each of said sleeves and a cylindrical flexible member supported by said disks, means comprising said sleeves and said disks for varying the tension of said flexible member, said disks being relatively movable with respect to said sleeves, and means for locking said disks against relative movement on said sleeves.

5. In a device of the class described, a rotatable shaft, a sleeve mounted thereon, a disk threadedly engaging around said sleeve, and a lock-nut threadedly engaging around said sleeve and adapted to be secured thereto and with said disk.

6. In a device of the class described, a rotatable shaft, a sleeve mounted thereon, a disk threadedly engaging around said sleeve, a lock nut threadedly engaging around said sleeve and adapted to be secured thereto and with said disk, and means for securing said sleeve to said shaft.

7. In a device of the class described, a rotatable shaft, a disk surrounding said shaft, and a sleeve threaded through said disk and mounted on said shaft.

8. In a device of the class described, a rotatable shaft, a disk surrounding said shaft, a sleeve threaded through said disk and mounted on said shaft, and means for securing said sleeve to said shaft.

In testimony whereof I have hereunto subscribed my name.

EUGENE J. REBECHINI.